(12) United States Patent
Barth et al.

(10) Patent No.: US 10,902,170 B2
(45) Date of Patent: Jan. 26, 2021

(54) METHOD FOR COMPUTER ASSISTED PLANNING OF A TECHNICAL SYSTEM

(71) Applicant: Siemens Aktiengesellschaft, Munich (DE)

(72) Inventors: Wilfried Barth, Leverkusen (DE); Engelbert Blumenthal, Wachtberg (DE); Metin Kaplan, Bonn (DE); Tobias Lange, Bonn (DE); Oswin Noetzelmann, Anaheim Hills, CA (US); Sarvananthan Ragavan, Frechen (DE); Rami Reuveni, Irvine, CA (US); Igor Usykov, Huntington Beach, CA (US); Marcel Wolff, Meckenheim (DE)

(73) Assignee: SIEMENS AKTIENGESELLSCHAFT, Meunchen (DE)

( * ) Notice: Subject to any disclaimer, the term of this patent is extended or adjusted under 35 U.S.C. 154(b) by 6 days.

(21) Appl. No.: 16/346,383

(22) PCT Filed: Oct. 31, 2016

(86) PCT No.: PCT/EP2016/076227
§ 371 (c)(1),
(2) Date: Apr. 30, 2019

(87) PCT Pub. No.: WO2018/077441
PCT Pub. Date: May 3, 2018

(65) Prior Publication Data
US 2020/0057832 A1 Feb. 20, 2020

(51) Int. Cl.
*G06F 30/39* (2020.01)
*G06F 30/36* (2020.01)
(Continued)

(52) U.S. Cl.
CPC ....... *G06F 30/367* (2020.01); *G05B 19/4188* (2013.01); *G06F 30/392* (2020.01);
(Continued)

(58) Field of Classification Search
CPC ............. G05B 19/4188; G06F 2110/20; G06F 30/367; G06F 30/392; G06F 30/394; G06F 30/398
(Continued)

(56) References Cited

U.S. PATENT DOCUMENTS 3,545,835 A * 12/1970 Leith et al. .............. G03H 1/06
359/27
3,767,308 A * 10/1973 Duffy ..................... G01B 9/021
356/496
2005/0262196 A1 11/2005 Mueller

FOREIGN PATENT DOCUMENTS

WO WO2011/025500 3/2011
WO WO2014/130430 8/2014

OTHER PUBLICATIONS

PCT International Search Report and Written Opinion of International Searching Authority dated Dec. 5, 2016 corresponding to PCT International Application No. PCT/EP2016/076227 filed Oct. 31, 2016.

* cited by examiner

*Primary Examiner* — Sun J Lin
(74) *Attorney, Agent, or Firm* — Cozen O'Connor

(57) ABSTRACT

A method for planning a technical system by providing a number of engineering objects in which each engineering object describes a technical component of the technical system, includes types that refer to a function of the engineering object and information about to what which domain of a plurality of domain each type belongs to and includes electrical information that includes a schematic symbol (Continued)

description, an electrical behavior and electrical characteristics, a number of coherence requirements for the technical system are provided, where the coherence requirements include object patterns defining objects of a same kind to be grouped together and a required order of a sequence of the objects in the object patterns, an engineering object is selected, a schematic is generated by placing the schematic symbol description of the selected engineering object and associated engineering objects of an object pattern belonging to the selected engineering object on a plan, and electrical connections between all objects of the object pattern of a same kind to be grouped together are generated in accordance with the coherence requirements.

11 Claims, 3 Drawing Sheets

(51) Int. Cl.
*G05B 19/418* (2006.01)
*G06F 30/367* (2020.01)
*G06F 30/392* (2020.01)
*G06F 30/398* (2020.01)
*G06F 30/394* (2020.01)
*G06F 111/20* (2020.01)

(52) U.S. Cl.
CPC .......... *G06F 30/394* (2020.01); *G06F 30/398* (2020.01); *G06F 2111/20* (2020.01)

(58) Field of Classification Search
USPC ........................................... 716/100
See application file for complete search history.

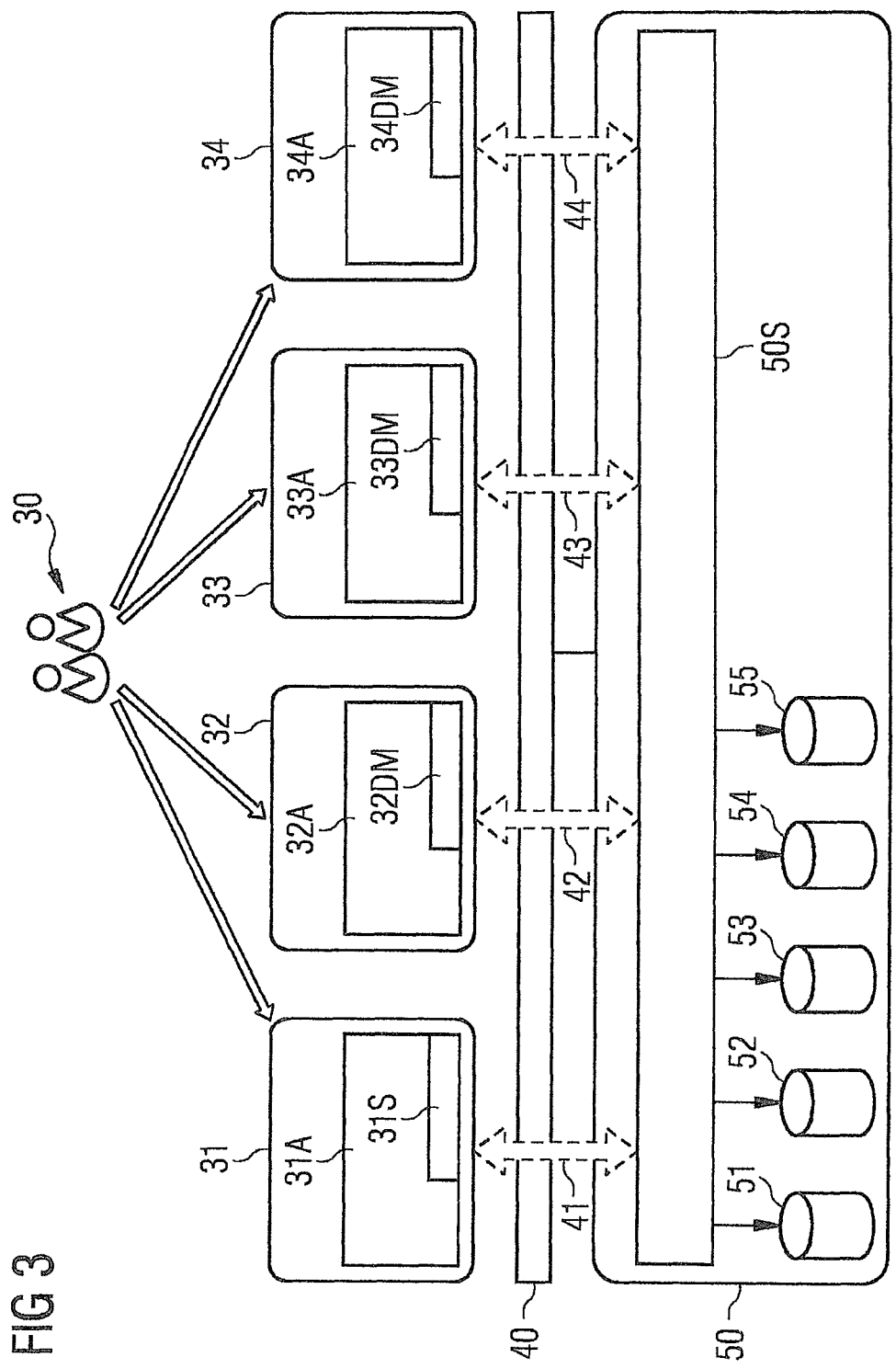

METHOD FOR COMPUTER ASSISTED PLANNING OF A TECHNICAL SYSTEM

CROSS-REFERENCE TO RELATED APPLICATIONS

This is a U.S. national stage of application No. PCT/EP2016/076227 filed Oct. 31, 2016, the content of which is incorporated herein by reference in its entirety.

BACKGROUND OF THE INVENTION

1. Field of the Invention

The invention refers to a method for computer assisted planning of a technical system, a corresponding computer program product and a system for computer assisted planning of a technical system.

2. Description of the Related Art

In computer assisted planning of technical systems, different categories are relevant for designing the components of the technical system. In the following, the term technical system has a broad meaning and covers industrial plants as well as technical products. Particularly, technical disciplines like mechanical engineering, electrical engineering, automation engineering and software engineering are involved in the design process of a technical system. The structure of the technical system with respect to the different disciplines is usually treated separately, thus resulting in a high overhead for engineers working in different disciplines in order to integrate the different discipline-specific structures in one common design of a technical system.

There are approaches to describe the technical components of a technical system by different objects being based on different domains. Each object represents a digital representation of a technical component and includes different aspects that refer to corresponding domains such as the above-mentioned engineering disciplines. However, there exists no concept up to now describing the integration of different disciplines during the planning of a technical system by the use of multi-domain objects.

In the process of planning a technical system, a large part of the work is to create accurate electrical schematics that visualize the electric detailed design. Schematics that visualize the electric detailed design up to now are generated by a schematic generator according to the "fire and forget" principle. After a functional model has been designed, the schematic generator is executed. Thereby, the generator collects information from a model like instance specific values and schematic snippets and generates the schematic. However, as explained above, the structure of the technical system with respect to different disciplines is treated separately, resulting in a poor change management capability. Hence, generating an electrical schematic is a one-way generation, where changes on the schematic cannot be adopted to a source model. In case changes are made to the source model, the schematics visualizing the electric detailed design have to be generated again due to changed input information.

SUMMARY OF THE INVENTION

In view of the foregoing, it is therefore an object of the invention to provide a computer assisted method enabling an easy efficient planning even if an input information changes frequently.

This and other objects and advantages are achieved in accordance with the invention by a method, a computer program product and a system for computer assisted planning, wherein the method for computer assisted planning is a technical system, in particular a production system or a product engineering system, and comprises providing a plurality of engineering objects, where each engineering object describes a technical component of the technical system and includes a type, where each type refers to a function (such as electrical, mechanical or automation) of the engineering object and information about to what domain of a plurality of domains the type belongs, and has an electrical information comprising schematic symbol description, electrical behavior and electrical characteristics.

A domain in the sense of the invention may be defined by arbitrary criteria and preferably refers to a discipline which is involved in the design process of the technical system. The disciplines are not restricted to technical engineering disciplines but, for example, may also comprise disciplines with respect to organizational aspects. However, the domains usually comprise one of the following technical domains: (i) mechanical engineering, (ii) electrical engineering, (iii) automation engineering, (iv) systems engineering, and (v) simulation.

A plurality of coherence requirements for the technical system are provided, where the coherence requirements comprise object patterns defining objects that belong together as well as a required order of an object sequence. In general, coherence requirements relate to data common in the process of planning the technical system. The required order of an object sequence, i.e., the objects that belong together, determines a relationship, particularly with regard to an electrical connection of the objects. The sequence can relate to data from multiple domains, for example, mechanical structure or automation related properties such as industrial network assignment.

Next, an engineering object is selected. The selection of an engineering object may be made by a planning engineer by using a graphical user interface, a textual file input, e.g., in an XML format, or a binary exchange with other multi-disciplinary systems.

A schematic is generated by placing the schematic symbol description of a selected engineering object and the associated engineering objects of an object pattern belonging to the selected engineering object on a plan by processing the coherence requirements to arrange the selected engineering object together with the associated engineering objects in the required order of sequence. The step of generating the schematics is computer assisted. In this step, associated engineering objects to the selected engineering object are found by retrieving the predefined coherence requirements for the technical system. The coherence requirements not only define objects that belong together but also contain information about a required order of an object sequence. As a result, the schematics can be generated in the required order of the engineering objects.

Last, electrical connections between all objects of the object pattern that belong together are generated in accordance with the coherence requirements.

The method in accordance with the invention allows engineers from multiple disciplines, for example, mechanical, electrical and automation, to create designs in the respective domains and without additional effort to get electrical schematics for those designs automatically. The method is based by predefined coherence requirements. A manual generation step for generating the electrical schematics after having selected an engineering object is not necessary. Electrical schematics will merely be available for the engineers based on the current engineering data. The method is useful not only for production engineering of plants, but also for product engineering and other forms of engineerings that require multi-disciplines and make use of electrical schematics.

By referring to coherence requirements, the method can generate an update of electrical schematics for the defined model without user invention if an object has been changed. The electrical schematics grows as the model grows, and vice versa, the model changes as the schematic has been changed.

Thereby, engineering standards can be applied automatically. They can benefit from the results in the form of readily created electrical schematics. No reformulation on manual application of engineering standards to specific projects and different disciplines have to be made. Instead, an engineer can concentrate on further developing standards and creating more sophisticated coherence requirements that ease the engineering process even more.

Planning of a technical system can be realized in less time. Reliability increases through avoidance of inconsistencies between multiple disciplines, but also between electrical schematics and a data model. The time saving factor accelerates even with longer use of the system, due to an engineer being able to use the freed time for refining and extending coherence requirements.

In a preferred embodiment, the number of engineering objects and its type information are stored in templates in a data base. Storing the number of engineering objects and its type information in templates facilitates further reuse.

The method will identify schematics-relevant-objects by its type. When new types are added to the database, electrical relevance can be determined and required data, such as symbol description, electrical behavior and electrical characteristics, can be added.

It should be noted that the templates can be multi-disciplinary templates with specific coherence requirements that apply when the template is reused in specific project environments.

In a further preferred embodiment of the invention, the coherence requirements are based on at least one object type. Furthermore, the coherence requirements may have a context, where the context is unique for every coherence requirement and/or relating to different domains.

Coherence requirements relate to data common in the technical system in the form of object pattern. As such, patterns of objects, such as physical devices, software variables, configuration settings or signals, which always must occur together can be determined. The object pattern is defined based on an object type and determines what additional objects are required to complete a circuit. The object pattern also captures a required order of the sequence of physical devices. This order determines a connection of the physical devices as well (i.e., an object before or after the sequence are connected). A sequence pattern can relate to data from multiple engineering domains, for example mechanical structure or automation related properties. Typical domains involved are mechanical plant-/product-/production-engineering as well as electrical-/fluidics-engineering for products, plants and production systems and the automation engineering for plants/products/production systems.

Coherence requirements have a context that determines when applicable. The context can be unique for every set of coherence requirement and relates to engineering data from any discipline, for example, mechanical properties or automation element connectivity. The context can also relate to project structuring. For example, if engineering data is organized with an EC81346 compliant system, then the coherence requirement context can determine that it only applies to objects of type "motor" that has apparent object of type "conveyor" in a functional aspect view.

In a further preferred embodiment of the invention, the step of generating the schematics comprises placing the schematic symbol descriptions of the engineering objects of an object pattern in one or two dimensions in a plane of the plan or in three dimensions in a space of the plan. The simplest definition of a circuit order is one dimensional, where a typical order is from top to bottom of the plan. It is also possible to have more dimensions, for example, two dimensions for a distribution on a plane or three dimensions for a distribution in space.

In a further preferred embodiment of the invention, the engineering system is a production system or a product engineering system.

In a further preferred embodiment, upon replacing one of the engineering objects from the plan through another engineering object, the step of generating the schematics and the electrical connections is again performed automatically after having completed the process of replacing. Hence, change management is very easy because changes are adapted on the schematics as soon as single engineering objects are replaced by other engineering objects.

It is also an object of the invention provide to a computer program product directly loadable into the internal memory of a digital computer, comprising software portions for implementing the method of the invention when the program is executed on a computer.

It is a further object of the invention to provide, a non-transitory computer readable medium encoded with a computer program executed by a computer that causes design of a technical system. The computer program comprises program code for providing a plurality of engineering objects, where each engineering object describes a technical component of the technical system and comprises a type, where each type refers to a function of the engineering object and information about to what domain of a plurality of domains the type belongs and has an electrical information comprising schematic symbol description, electrical behavior and electrical characteristics.

It comprises program code for providing a number of coherence requirements for the technical system, where the coherence requirements comprises object patterns defining objects that belong together as well as a required order of an object sequence. The computer readable medium furthermore comprises program code for generating a schematics by placing the schematic symbol description of the selected engineering object and the associated engineering objects of an object pattern belonging to the selected engineering object on a plan by processing the coherence requirements to arrange the selected engineering object together with the associated engineering objects in the required order of sequence. The computer readable medium comprises program code for generating electrical connections between all objects of the object pattern that belong together according to the coherence requirements.

It is a further object of the invention to provide a system for computer assisted planning of a technical system, wherein the system comprises a first providing unit configured to provide a number of engineering objects, where each engineering object describes a technical component of the technical system and comprises a type, where each type referring to a function of the engineering object and an information about to what domain of a plurality of domains the type belongs, and has electrical information comprising schematic symbol description, electrical behavior and electrical characteristics, a second providing unit configured to provide a plurality of coherence requirements for the technical system, where the coherence requirements comprises object patterns defining objects that belong together as well as an required order of an object sequence, a selecting unit configured to receive a selected engineering object, a first design unit configured to generate a schematic by placing the schematic symbol description of the selected engineering object and the associated engineering objects of an object pattern belonging to the selected engineering object on a plan by processing the coherence requirements to arrange the selected engineering object together with the associated engineering objects in the required order of sequence, and a second design unit configured to generate electrical connections between all objects of the object pattern that belong together in accordance with the coherence requirements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments of the invention will now be described with reference to the accompanying drawings, in which:

FIG. 3 shows an exemplary multi-disciplinary engineering system in accordance with an embodiment of the invention.

DETAILED DESCRIPTION OF THE EXEMPLARY EMBODIMENTS

It will be readily understood that the components of the present invention, as generally described and illustrated in the figures herein, may be arranged and designed in a wide variety of different configurations. Thus, the following more detailed description of the embodiments of the present invention, as represented in FIGS. 1 to 3, is not intended to limit the scope of the claimed invention, but is merely representative of selected embodiments of the invention.

Mechatronics is the synergistic combination of mechanical engineering, electronic engineering, control engineering, system design engineering, and computer engineering to create useful products or systems (e.g., manufacturing or production systems, product engineering systems or systems for process industries or consumer products). This interdisciplinary engineering approach particularly supports the design of hybrid systems comprising different disciplines (e.g., data processing, mechanics or electronics). Furthermore, this approach allows a generation of simpler, more economical, reliable and versatile systems. The main concept of this engineering approach is the concept of mechatronic objects, also referred to as engineering objects throughout this description. Mechatronic objects or engineering objects are software objects and support the paradigm of object oriented programming and system development.

These engineering objects are used in a multi-disciplinary engineering system that allows engineers from multiple disciplines to work on common or connected data. For example, a factory planner can work together with a mechanical engineer, an electrical engineer and an automation engineer to plan a new production line for a product assembly. The domains, i.e., the different disciplines, that the below described exemplified embodiment of this invention incorporate are mechanical plant-/product-/production-engineering as well as electrical-/fluidics-engineering for products, plants and production systems and the automation engineering for plants/products/production systems.

Figure 1:
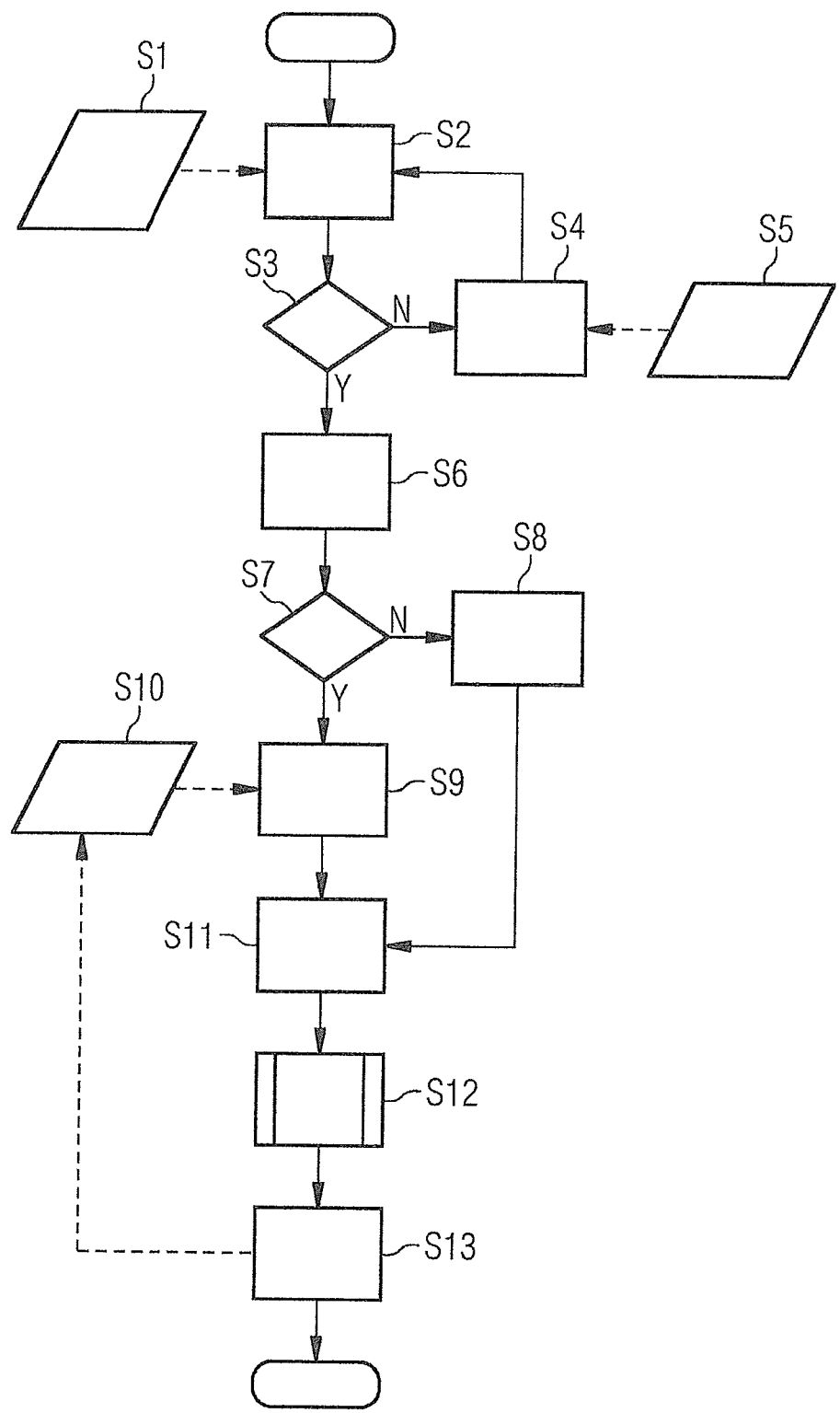
FIG. 1 shows a flow chart of a schematic creation method in accordance with the invention.
Figure 2:
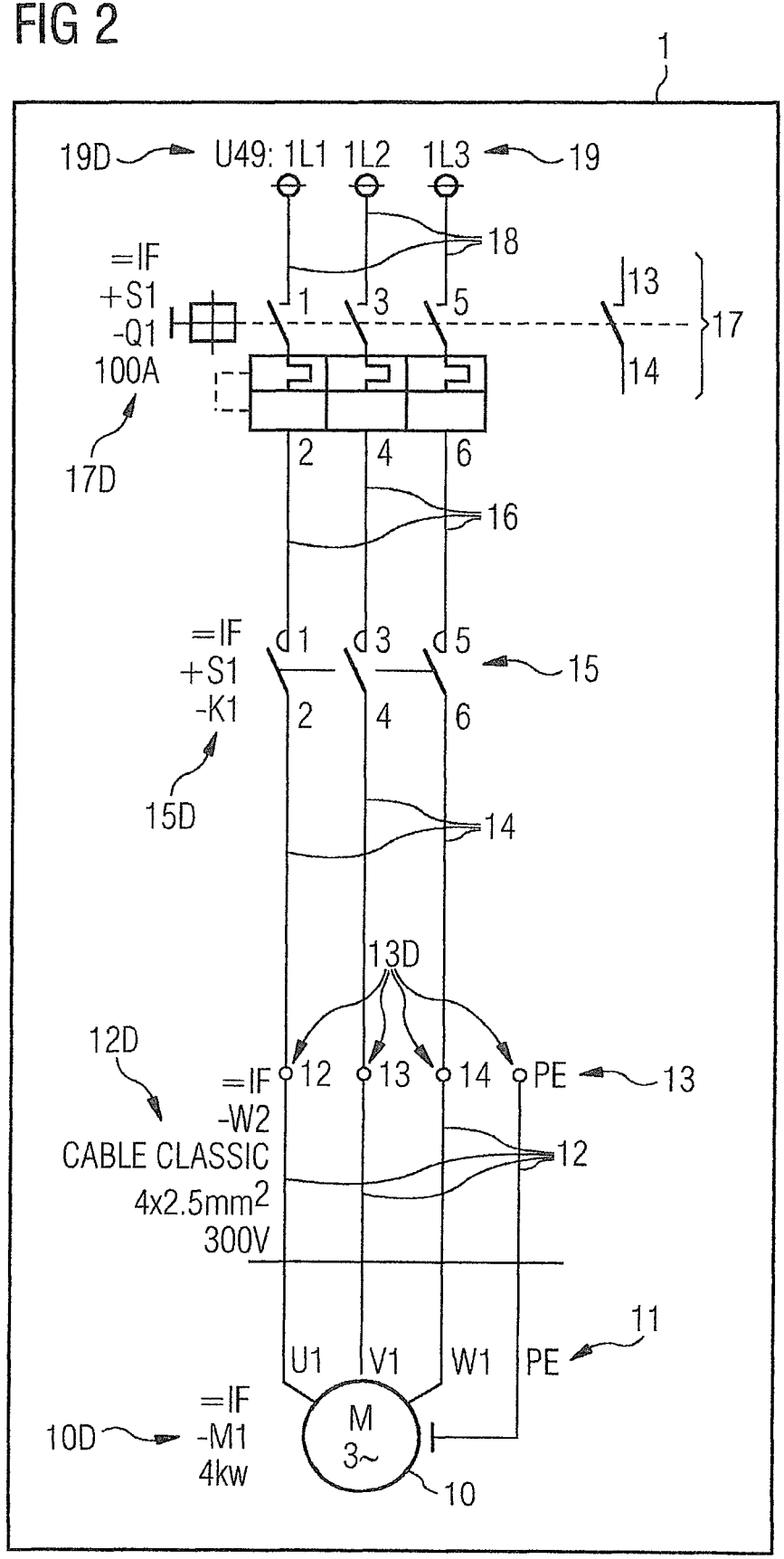
FIG. 2 shows an exemplary motor circuit generated with the method in accordance with the invention.

When engineering data is entered by a user in a system for computer assisted planning of a technical system in accordance with the invention, the system uses the method illustrated in FIG. 1 to ensure up-to-date schematics with respect to an electrical circuit resulting from the planning of the technical system. Referring to FIG. 1, in step SI, multi-disciplinary plant and/or machine engineering data is provided. In step S2, a user can add data to the planning of the technical system in the form of engineering objects, also referred to as selected objects. In this step, schematic relevant physical devices, such as sensors and actuators, in the multi-disciplinary data model are identified. Each object has a type that determines what the function of the object is and to what domain it belongs. The electrically relevant types have electrical information attached, for example, schematic symbol descriptions, electrical behavior and electric characteristics. Objects and type information are stored in a library for reuse. The method identifies schematics-relevant devices by its type. For example, if an engineering object such as a conveyor dealt, has been added with a motor, sensor and cables, the system knows that the motor, the sensors and cables are electrically relevant. This information can be derived from the mechanical domain, the electrical or the automation domain. When new types are added to the system, the electrical relevance can be determined and required data, such as symbol descriptions, electrical behavior and characteristics, can be added.

In the field of planning of a technical system engineering solutions can be prepared in multi-disciplinary templates with specific coherence requirements that apply when the template is reused in other project environments.

Coherence requirements relate to data common in planning of the technical system in form of object patterns. Coherence requirements are used for completion of an electrical circuit referring to an engineering object that has been selected and added from a user to the technical system in step S2. The specification of the coherence requirement is made prior to conducting the method in accordance with the invention. The provision of the coherence requirements is made in step S5 of the flow chart of FIG. 1. In a coherence requirement, objects that always have to occur together can be determined by the user. These are called object patterns. The object patterns are defined based on an object type and determines what additional objects are required to complete the electrical circuit. The object pattern also captures a required order of an object sequence, called sequence pattern. The order determines the connection of the objects, i.e., the physical devices, as well. The sequence pattern can relate to data from multiple engineering domains, for example, a mechanical structure or a Programmable Logic Controller (PLC) automation related property such as industrial network assignment. The typical domains involved are the mechanical-/plant-/product-/production-engineering as well as electrical-/fluidics-engineering for products, plants and production systems and the automation engineering for plants/products/production systems.

The above mentioned coherence requirements have a context that determines when applicable. This context can be unique for every set of coherence requirement and relate to engineering data from any discipline, for example, mechanical properties or automation relevant connectivity. It can also relate to project structuring. For example, if engineering data is organized with an EC81346 compliant system, then the coherence requirement context can determine that the coherence requirement only applies to objects of a specific type of motor that has apparent object of the type conveyor in a functional aspect view.

As an example, if in step S2 of FIG. 1 the user has added a specific motor for a conveyor in a technical system, then the method in accordance with the invention will proceed with step S3, verifying whether the data is complete. If not (path "N"), then the method will proceed with step S4 to add object data in accordance with the coherence requirements provided in step S5. After that, the method will return to step S2 repeating steps S3 and S4 until all devices and objects belonging to the selected object in step S2 are completed. To have a complete circuit for a motor (as a selected engineering object) for a conveyor in the technical system to be planned, at least a power supply, a circuit breaker, wires, a drive/contactor, terminals, and cables have to be considered.

To specify coherence requirements, a graphical user interphase can be used as well as a textual file input, e.g., in a XML format. Even binary exchange with other multiple-disciplinary systems is possible.

If the data for the technical system is complete (path "Y"), then the method proceeds to step S6. In step S6, the sequence of placement of the objects, i.e., the physical devices, is determined. This determination is based on the predefined coherence requirements, i.e., the beforehand determined devices and objects to be considered. The simplest definition of a circuit order is one-dimensional, such that the devices can be ordered from top to bottom on a plan, i.e., a paper page or an electronic sheet of a planning system of a computer. It is also possible to have more dimensions, such as two dimensions for a distribution on a plane or three dimensions for a distribution in space.

If in the aforementioned example the motor circuit is to be planned in the technical system, then a one-dimensional sequence is appropriate. The motor as the actuator will be placed in a lower position, which can be seen from FIG. 2. In this figure, the motor that represents the selected object is denoted with reference numeral 10. The power supply is (which is an associated object to the motor) denoted with reference numeral 19 and placed on the top position of the plan 1. Between the power supply 19 and the motor 10, the following devices (further associated objects) will be placed in the sequence of order, starting from the power supply 19: optional cables 18, circuit breaker 17, wires 16, drive/contactor 15, wires 14, terminals 13, cable 12 which are connected to connection points 11 of the motor 10. With these devices of the coherence requirement, the system will know the sum and sequence of all objects of the circuit, from the power supply 19 to the motor 10 top to bottom on the schematic plan. This information is also called a coherent device cluster.

In step S7, a check is performed to determine whether such a schematic as illustrated in FIG. 2 already exists. If not (path "N"), in step S8 the schematics as illustrated in FIG. 2 is then created. If the schematic already exists (path "Y"), then an update object representation on the schematic routine is initiated. This routine is based on an existing schematic provided in step S10.

In step S11, which is either initiated from step S8 or step S9, additional objects are or may be placed on the schematic. In this step, it is ensured that a schematic exists and the size and dimensions are sufficient for the placement of the coherent device cluster. The symbols and electrical information of each object are then placed on the drawings based according to the sequence previously determined. Symbol size and spacing are taken into account to produce a result that does not have symbol overlap. It can be seen from FIG. 2 that the motor 10 is accompanied with its symbol and an electrical information 10D attached to the symbol. The same is true for the cable 12 (accompanied by electrical information 12D), the drive/contactor 15 (accompanied by electrical information 15D), the circuit breaker 17 (accompanied by electrical in-formation 17D) and the power supply 19 (accompanied by electrical information 19D).

When additional objects are placed on a schematic, the method proceeds to step S12 to perform an automatic re-connection. In step S13 the schematic is published to the user. Optionally, the schematic is provided and stored for further reuse in step S10.

The invention considers space constraints on a chosen page size and creates a number of pages that can fit the complete circuit. The symbols are placed in accordance with the coherence requirements, and inter-page references are created wherever a page break is in between a connection line.

Distribution of symbols (see, e.g., FIG. 2) also takes into account the amount of visual clutter through crossing lines, symbol clustering, etc. to maximize engineer readability within the given coherence requirements.

The collaboration between multi-disciplines can be realized as shown in the schematics in FIG. 3. One or more users 30 belonging to one or more of different disciplines 31, 32, 33, 42, each of them having a multi-disciplinary engineering system application part 32A, 33A, 34A with a schematics 31S and an another data model 31DM, 32DM, 33DM, 34DM respectively, can communicate via a network 14 with a team center application 50. The electrical design application 31 is an example of a system with model based electrical schematics. The multi-disciplinary model serves the application electrical design 31, automation design 32, lines design 33 and modelling and engineering application 34. The team center application 50 consists of a multi-disciplinary engineering system server part 50S having access to coherence requirements and engineering objects of different domains 51, 52, 53, 54, 55. The communication paths between a respective multi-disciplinary engineering system application part 31A, 32A, 33A, 34A and the multi-disciplinary engineering system server part 50S is made via dedicated communication channels 41, 42, 43, 44.

The team center application 50 provides a meta-model based repository system and can be used as a data platform for the engineering platforms 31, 32, 33, 34 of the different disciplines. It is further used as an automation engineering application and a factory layout application. Together, these applications form an integrated multi-disciplinary engineering system.

By using the described system methods, a user can enter data in the form of a multi-disciplinary model that represents, for example, mechanical, electrical and automation engineering data as well as coherence requirements. With the coherence requirements, the system can draw and update electrical schematics for the model without user intervention. Schematics can grow as the model grows and, vice versa, a model changes as the schematic has been changed. A user gets his engineering standards applied automatically and benefits from the results in the form of readily created electrical sheets. A user is not required to repeatedly reformulate or manually apply his engineering standard to specific projects and different discipline data. Instead, a user can concentrate on further developing standards and creating more sophisticated coherence requirements that ease the engineering process even more.

The method in accordance with the disclosed embodiments advantageously saves engineering time and increases reliability on schematics through avoidance of inconsistencies between multiple disciplines but also between schematics and the data model. The time saving factor accelerates even the longest use of the system due to the engineer being able to use the freed time for refining and extending the coherence requirements.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for computer assisted planning of a technical system, the method comprising:
   providing a plurality of engineering objects in which each engineering object describes a technical component of the technical system and comprises a type, said each type referring to a function of said each engineering object and information about which domain of a plurality of domains said each type belongs to, and includes electrical information compromising a schematic symbol description, an electrical behavior and electrical characteristics;
   providing a plurality of coherence requirements for the technical system, the plurality of coherence requirements comprising object patterns defining objects of a same kind to be grouped together as well as a required order of a sequence associated with the objects in the object patterns;
   selecting an engineering object from the plurality of engineering objects;
   generating a schematic by placing the schematic symbol description of the selected engineering object and associated engineering objects of an object pattern belonging to the selected engineering object on a plan by processing the plurality of coherence requirements to arrange the selected engineering object together with the associated engineering objects in a required order of sequence; and
   generating electrical connections between all objects of the object pattern of a same kind to be grouped together in accordance with the plurality of coherence requirements.

2. The method according to claim 1, wherein the plurality of engineering objects and type information associated with each engineering object of the plurality of engineering objects are listed in templates stored in a database.

3. The method according to claim 2, wherein the plurality of coherence requirements are provided based on at least one object type.

4. The method according to claim 1, wherein the plurality of coherence requirements are provided based on at least one object type.

5. The method according to claim 1, wherein the plurality of coherence requirements have a context, requirements of the context being at least one of: (i) unique for every coherence requirement of the plurality of coherence requirements and (ii) relating to different domains of the plurality of domains.

6. The method according to claim 1, wherein said generating the schematics comprises placing the schematic symbol descriptions of the engineering objects of the object pattern in one or two dimensions in a plane of the plan or in three dimensions in a space of the plan.

7. The method according to claim 1, wherein the plurality of domains comprises at least one (i) a mechanical engineering domain, (ii) an electrical engineering domain, (iii) an automation engineering domain, (iv) a systems engineering domain and (v) a simulation domain.

8. The method according to claim 1, wherein the one engineering system is a production system or a product engineering system.

9. The method according to claim 1, wherein upon replacing one of the engineering objects from the plan with another engineering object, said generating the schematics and said generating the electrical connections are performed automatically after having completed said replacing one engineering object of the engineering objects from the plan with another engineering object.

10. A non-transitory computer readable medium encoded with a computer program which, when executed by a computer, causes the computer to design a technical system, the computer program comprising:
   program code for providing a plurality of engineering objects in which each engineering object describes a technical component of the technical system and comprises a type, each type referring to a function of said each engineering object and information about which domain of a plurality of domains said each type belongs to, and includes electrical information comprising a schematic symbol description, an electrical behavior and electrical characteristics;
   program code for providing a plurality of coherence requirements for the technical system, the plurality of coherence requirements comprising object patterns defining objects of a same kind to be grouped together as well as a required order of a sequence of the objects in the object patterns;
   program code for selecting an engineering object from the plurality of engineering objects;
   program code for generating a schematic by placing the schematic symbol description of the selected engineering object and associated engineering objects of an object pattern belonging to the selected engineering object on a plan by processing the plurality of coherence requirements to arrange the selected engineering object together with the associated engineering objects in a required order of sequence; and program code for generating electrical connections between all objects of the object pattern of a same kind to be grouped together in accordance with the plurality of coherence requirements.

11. A system for computer assisted planning of a technical system, the system comprising:

a first providing unit configured to provide a plurality of engineering objects in which each engineering object describes a technical component of the technical system and comprises a type, each type referring to a function of said each engineering object and information about which domain of a plurality of domains said each type belongs to, and includes electrical information comprising a schematic symbol description, an electrical behavior and electrical characteristics;

a second providing unit configured to provide a plurality of coherence requirements for the technical system, the plurality of coherence requirements comprising object patterns defining objects of a same kind to be grouped together and a required order of a sequence of the objects in the object patterns;

a selecting unit configured to receive a selected engineering object from the plurality of engineering objects;

a first design unit configured to generate a schematic by placing the schematic symbol description of the selected engineering object and associated engineering objects of an object pattern belonging to the selected engineering object on a plan by processing the coherence requirements to arrange the selected engineering object together with the associated engineering objects in the required order of sequence; and a second design unit configured to generate electrical connections between all objects of the object pattern of a same kind to be grouped together according to the coherence requirements.

* * * * *